United States Patent
Su

(10) Patent No.: US 11,354,543 B2
(45) Date of Patent: Jun. 7, 2022

(54) CONVOLUTIONAL NEURAL NETWORK FILTER STACKER FOR COLORIZATION PREPROCESSING

(71) Applicant: KYOCERA DOCUMENT SOLUTIONS INC., Osaka (JP)

(72) Inventor: Dongpei Su, Palos Verdes, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 82 days.

(21) Appl. No.: 17/027,351

(22) Filed: Sep. 21, 2020

(65) Prior Publication Data

US 2022/0092355 A1 Mar. 24, 2022

(51) Int. Cl.
G06K 9/62 (2022.01)
G06T 11/00 (2006.01)
G06V 10/20 (2022.01)

(52) U.S. Cl.
CPC ......... *G06K 9/6262* (2013.01); *G06K 9/6256* (2013.01); *G06T 11/001* (2013.01); *G06V 10/20* (2022.01)

(58) Field of Classification Search
CPC .. G06K 9/6262; G06K 9/6256; G06T 11/001; G06V 10/20
USPC ........................................................ 382/157
See application file for complete search history.

(56) References Cited

U.S. PATENT DOCUMENTS

| | | | |
|---|---|---|---|
| 5,200,816 A | * | 4/1993 | Rose .................... H04N 1/6033 358/518 |
| 8,401,313 B2 | | 3/2013 | Yamamoto et al. |
| 10,192,146 B2 | | 1/2019 | Sen et al. |
| 10,311,552 B2 | | 6/2019 | Meyer et al. |
| 10,387,772 B1 | | 8/2019 | Fang et al. |
| 2016/0321523 A1 | * | 11/2016 | Sen ........................ G06N 3/084 |
| 2017/0061620 A1 | * | 3/2017 | Park .......................... G06T 5/50 |

OTHER PUBLICATIONS

He, K., et al., "Deep Residual Learning for Image Recognition," retrieved from the internet at: <https://www.cvfoundation.org/openaccess/content_cvpr_2016/papers/He_Deep_Residual_Learning_CVPR_2016_paper.pdf> retrieved on Sep. 21, 2020, 9 pages.

(Continued)

*Primary Examiner* — Ayodeji O Ayotunde
(74) *Attorney, Agent, or Firm* — GrowIP Law Group LLC

(57) ABSTRACT

Methods and systems for training and utilizing an artificial neural network (ANN) are provided. In an example method, a computing device can receive an image pair, where a first image of the image pair includes a training image and a second image of the image pair includes a ground truth image. The computing device can provide instances of the first image to a plurality of image filtering modules and determine respective filtered representations of the first image using the plurality of image filtering modules. The computing device can indirectly train an adaptor ANN by applying the adaptor ANN on the respective filtered representations to produce an adapted representation; determining, using a trained colorization ANN, a colorized image from the adapted representation; and updating weights of the adaptor ANN based on a loss function that comprises a difference between the colorized image and the second image of the image pair.

20 Claims, 11 Drawing Sheets

(56) References Cited

OTHER PUBLICATIONS

Ledig, C., et al., "Photo-Realistic Single Image Super-Resolution Using a Generative Adversarial Network," retrieved from the internet at: <https://arxiv.org/pdf/1609.04802.pdf> dated May 25, 2017, retrieved on Sep. 21, 2020, 19 pages.

Li, C., et al., "Adapting Image Super-Resolution State-of-the-arts and Learning Multi-model Ensemble for Video Super-Resolution," retrieved from the internet at: <https://arxiv.org/pdf/1905.02462.pdf> dated May 7, 2019, retrieved on Sep. 21, 2020, 8 pages.

Ganbold, G., "Hisotry Document Image Background Noise and Removal Methods," International Journal of Knowledge Content Development & Technology vol. 5, No. 2, pp. 11-24 (Dec. 2015).

Gangamma, B., et al., "Restoration of Degraded Historical Document Image," Journal of Emerging Trends in Computing and Information Sciences, vol. 3, No. 5, pp. 792-798, May 2012.

Toshi-k, "Kaggle Denoising Dirty Documents," retrieved from the internet at: <https://github.com/toshi-k/kaggle-denoising-dirty-documents> retrieved on Sep. 21, 2020, 24 pages.

\* cited by examiner

FIG. 7A

CONVOLUTIONAL NEURAL NETWORK FILTER STACKER FOR COLORIZATION PREPROCESSING

BACKGROUND

An artificial neural network (ANN) can be trained to perform various types of tasks. As one example, an ANN could be trained to output colorized versions of colorless images. As another example, an ANN could be trained to perform optical character recognition (OCR) on a document. Other examples are also possible.

Sometimes, the inputs into an ANN could exhibit a variety of defects and/or artifacts. Accordingly, if the ANN were trained using such inputs, the overall accuracy and performance of the ANN may be negatively affected.

SUMMARY

Herein described are techniques generally related to utilizing artificial neural networks (ANNs) and machine learning (ML) to improve image and document processing.

Accordingly, in a first example embodiment, a computer-implemented method is provided. A computing device could receive an image pair. A first image of the image pair could include a respective initial training image and a second image of the image pair could include a respective ground truth training image. The computing device could provide instances of the first image to a plurality of image filtering modules. Each of the image filtering modules could be configured to apply an image filter on an input image and output a filtered representation of the input image. The computing device could determine respective filtered representations of the first image using the plurality of image filtering modules. The computing device could indirectly train an adaptor ANN. The indirect training could include applying the adaptor ANN on at least the respective filtered representations of the first image to produce an adapted representation of the first image. The indirect training could also include determining, using a trained colorization ANN, a colorized image from the adapted representation. The indirect training could further include computationally updating weights of the adaptor ANN based on a loss function that comprises a difference between the colorized image and the second image of the image pair. The computing device could provide the plurality of image filtering modules, the trained adaptor ANN, and the trained colorization ANN.

In a second example embodiment, a computing device is provided. The computing device includes one or more processors; and non-transitory data storage. The non-transitory data storage stores at least computer-readable instructions that, when executed by the one or more processors, cause the computing device to perform tasks in accordance with the first example embodiment.

In a third example embodiment, an article of manufacture is provided. The article of manufacture includes non-transitory data storage storing at least computer-readable instructions that, when executed by one or more processors of a computing device, cause the computing device to perform tasks in accordance with the first example embodiment.

In a fourth example embodiment, a computing system may include various means for carrying out each of the operations of the first example embodiment.

In a fifth example embodiment, a computer-implemented method is provided. A computing device could receive a document pair. A first document of the document pair could include a respective initial training document and a second document of the document pair could include a respective ground truth training document. The computing device could provide instances of the first document to a plurality of document filtering modules. Each of the document filtering module could be configured to apply a document filter on an input document and output a filtered representation of the input document. The computing device could determine filtered representations of the first document using the plurality of document filtering modules. The computing device could train a de-noise ANN. The training could include applying the de-noise ANN on at least the respective filtered representations of the first document to produce a de-noised representation of the first document. The training could also include computationally updating weights of the de-noise ANN based on a loss function that comprises a difference between the de-noised representation and the second document of the document pair. The computing device could provide the plurality of document filtering modules and the trained de-noise ANN.

In a sixth example embodiment, a computing device is provided. The computing device includes one or more processors; and non-transitory data storage. The non-transitory data storage stores at least computer-readable instructions that, when executed by the one or more processors, cause the computing device to perform tasks in accordance with the fifth example embodiment.

In a seventh example embodiment, an article of manufacture is provided. The article of manufacture includes non-transitory data storage storing at least computer-readable instructions that, when executed by one or more processors of a computing device, cause the computing device to perform tasks in accordance with the fifth example embodiment.

In an eighth example embodiment, a computing system may include various means for carrying out each of the operations of the fifth example embodiment.

Other aspects, embodiments, and implementations will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIGS. 7A and 7B depict various document artifacts, according to example embodiments.

DETAILED DESCRIPTION

Figure 1:
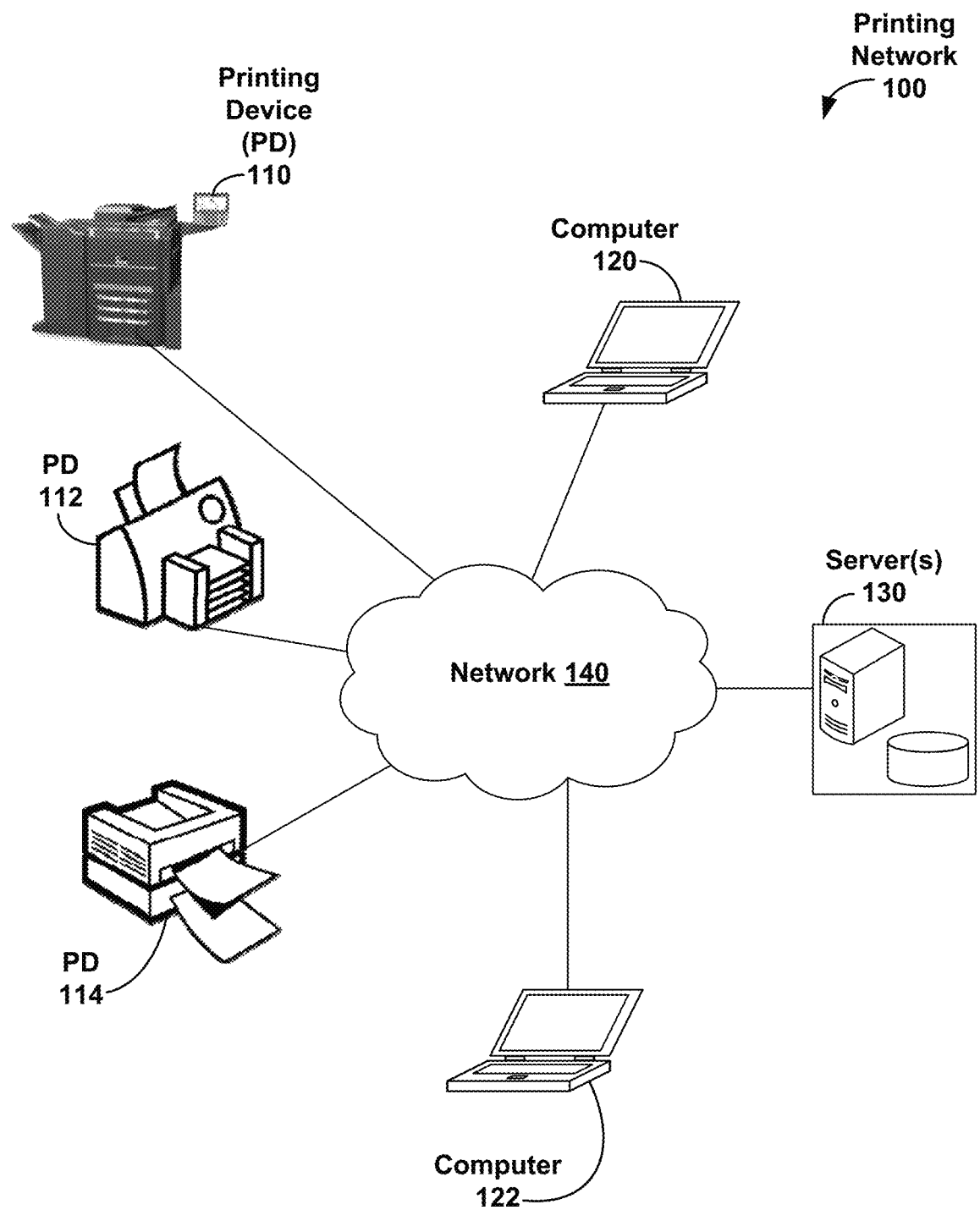
FIG. 1 is a diagram of a printing network, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. INTRODUCTION

An artificial neural network (ANN) can be trained with a large number of images or documents (e.g., hundreds, thousands, or even more images or documents) to perform various types of tasks. As one example, the ANN could be trained to output colorized versions of colorless images. As another example, the ANN could be trained to perform optical character recognition (OCR) on documents. Other examples are also possible.

The ANN can include a collection of "nodes" or connected units of computation that can loosely model computation. Connected nodes of the ANN can transmit signals between each other; such as numerical values. Each node can receive one or more input signals, weight the input signals, and combine the weighted input signals to generate one or more output signals. A weight of an input signal can be a numerical value that increases or decreases an effect of its input signal on the output signal.

The ANN can have one or more "layers" or groups of nodes including, but not limited to, one or more layers of input nodes, nodes arranged in one or more hidden layers, and one or more layers of output nodes. Intermediate layers that are between an input layer and an output layer can be termed "hidden layers" as these in-between layers are not visible/hidden from entities outside of the ANN. Other example ANN layers include but are not limited to, input layers and output layers that respectively receive inputs from and provide outputs to entities outside of the ANN, convolutional layers which convolve (e.g., downsample) their inputs, activation (e.g., RELU) layers which apply an activation function to their inputs, pooling layers which combine their inputs, and fully-connected layers where each node in the fully-connected layer receives all outputs from a previous layer as its inputs.

During training, the ANN can adjust weights within nodes based on a loss function that provides feedback on task performance by the ANN. Once the ANN is deemed to be trained, the trained ANN can be termed a "model" and can generate output predictions based on corresponding inputs. For example, if an input includes a colorless image, the ANN can perform an image enhancement technique on the colorless image and generate an output that includes a colorized version of the colorless image. As another example, if an input is a document containing text, the ANN can perform an OCR task on the document and generate an output that includes a machine-encoded version of the text in the document. Other examples are also possible.

Training an ANN can involve supervised learning. Supervised learning involves having the ANN infer a function to perform one or more tasks from labeled training data consisting of one or more training data items. In some examples, a training data item includes at least an input image/document and a desired output image/document that can act to "label" or identify a result of the ANN's execution of the function operating on the input image/document. The desired output image/document of the training data item can be termed as a "ground truth" image/document.

Sometimes, inputs into an ANN may exhibit various types of defects/artifacts. For instance, the colorless images as described above could exhibit one or more quality issues; e.g., low contrast, non-uniform illumination, low resolution, blocky artifacts, etc. As another example, the documents as described above could exhibit various noises; e.g., unbalanced backgrounds, salt-and-pepper noise, background spots, etc. Other types of defects/artifacts could also exist.

In line with the discussion above, if an ANN were to be trained on inputs that exhibited defects/artifacts, the overall accuracy and performance of the ANN may be negatively affected. Thus, it may be advantageous to resolve such defects/artifacts from such inputs.

In theory, one solution to resolve such defects/artifacts is to train a single ANN to both resolve defect/artifacts and also perform one or more image processing tasks (e.g., colorization and/or OCR tasks). For example, an ANN could be trained to first remove salt-and-pepper noise from an input image and then perform OCR on that input image. Yet, this theoretical solution has its own issues. Since the ANN is being trained to perform multiple actions, the model complexity and dimensionality of the ANN could increase exponentially. This could cause the ANN to experience severe overfitting. Further, it may be prohibitively expensive to prepare enough training data to cover all edge cases that would be experienced by the ANN. Because of these and other reasons, training an ANN to both resolve defect/artifacts and also perform one or more image processing tasks becomes impractical.

The herein described techniques can be used to solve this technical problem. In particular, the present disclosure provides for a process that involves applying various filtering modules on an input image/document. Each of these filtering modules could contain a specific filter designed to identify a particular defect/artifact that might occur on the input image/document. The outputs of these filtering modules (as well as the original input image/document) could be concatenated together and provided to a de-noise ANN, which could take the form of a convolution neural network (CNN) that is configured to receive an input image and correspondingly generate a defect-free/artifact-free representation of that input image.

In some examples, a computing device could directly train the de-noise ANN, for instance, by computationally updating the weights of the de-noise ANN based on a comparison between the output from the de-noise ANN and a ground truth image. In some other examples, a computing device could indirectly train the de-noise ANN, for instance, by applying the de-noise ANN on the outputs of the filtering modules (as well as the original image/document), applying a second ANN to the output of the de-noise ANN, then computationally updating the weights of the de-noise ANN based on a comparison between the output from the second ANN and a ground truth image. As used herein, "indirect training" refers to a training process in which the immediate output from a machine learning model is not the only output used to computationally update the machine learning model. Instead, during "indirect training", the output from another machine learning model may be used to computationally update the machine learning model. For instance, in the example above, the immediate output from the de-noise ANN is not used to computationally update the de-noise ANN. Rather, the output from the second ANN is used to calculate the loss and computationally update the de-noise ANN.

Using herein described techniques can provide numerous benefits. For one, because the filtering modules have already performed the computationally intensive work of identifying particular defects/artifacts in the input image/document, the complexity and dimensionality of the de-noise ANN could be much less than if the de-noised ANN had to identify particular defects/artifacts itself. Further, the use of the aforementioned indirect training allows the de-noise ANN to "adapt to" the task being performed by the second ANN, thereby improving the performance of image processing pipelines that involve the de-noise ANN and the second ANN. For this reason, the de-noise ANN also could be referred to herein as an "adaptor ANN". Accordingly, the described techniques allow for the construction of large image processing pipelines that do not incur too much performance loss. Other benefits may also exist.

II. EXAMPLE PRINTING NETWORKS AND COMPUTING DEVICES

FIG. 1 is a diagram illustrating printing network 100, according to example embodiments. Printing network 100 includes printing devices (PDs) 110, 112, 114, computers 120, 122, and one or more servers 130, all interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In example embodiments, some or all printing devices 110, 112, 114 can be connected to network 140 through one or more, possibly different, network protocols. Data can be transmitted between printing devices 110, 112, 114, computers 120, 122, and server(s) 130 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 120, 122, and/or server(s) 130 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, and/or server(s) 130 to inform other devices about colorant-usage, maintenance, error, and/or other conditions of the printing devices; e.g., idle, printing, sleeping, paper jam, low or out of paper, low or out of toner/ink, etc. Other communications between computers 120, 122, and/or server(s) 130 are possible as well, such as, but not limited to, requests to render images using radial gradient coloring and related responses to the requests, are possible as well.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS), Simple Message Transfer Protocol (SMTP), SNMP, Transfer Control Protocol/Internet Protocol (TCP/IP), User Datagram Protocol (UDP), Lightweight Directory Access Protocol (LDAP), Message Queue (MQ), and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/ servers of printing network 100. In particular, computers 120, 122 can provide displays related to maintaining printing devices, including displays related to colorant usage for printing devices and/or predictions related to colorant usage, where the printing devices can include but are not limited to printing devices 110, 112, 114.

One or more servers 130 can store, update, delete, retrieve, and provide functionality for learning patterns, trends, and/or features about data related to printing network 100, particularly related to printing devices, such as printing devices 110, 112, 114. Based on the learned patterns, trends, and/or features, server(s) 130 can generate outputs, such as predictions about the printing devices including but not limited to predictions of colorant usage by the printing devices. The data stored on server(s) 130 can include device information, colorant-usage information, maintenance-event information, and/or other information related to devices related to printing network 100. The stored data can be retrieved from server(s) 130 in response to a received query (or queries) requesting information about specific device(s), colorant usage, maintenance events, and/or other information.

In some embodiments, server(s) 130 can provide additional services as well (or instead), such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 100. For example, server(s) 130 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 100. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by server(s) 130 and perhaps other data.

Figure 2:
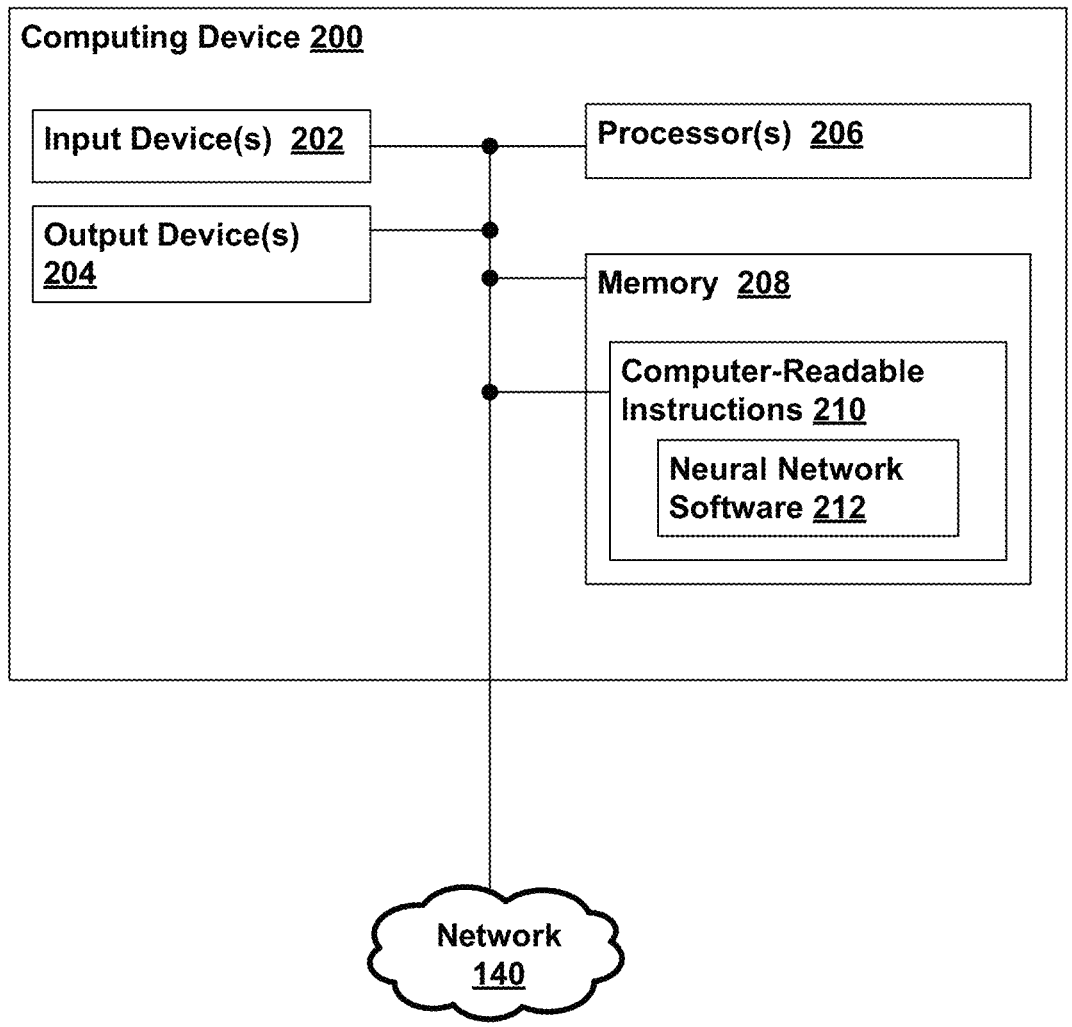
FIG. 2 is a block diagram illustrating a computing device, according to example embodiments.

FIG. 2 is a schematic block diagram illustrating computing device 200, according to example embodiments. Computing device 200 can include one or more input devices 202, one or more output devices 204, one or more processors 206, and memory 208. In some embodiments, computing device 200 can be configured to perform one or more herein-described functions of and/or functions related to: e.g., some or all of at least the functionality described in the context of an artificial neural network, a convolutional neural network, a recurrent neural network, artificial neural networks 400, 500, 700, 750, 1100, pipelines 300 and 600, processes 800 and 1200, and methods 900 and 1300.

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), additional graphics-related circuitry/processors, etc.). Processors 206 can be configured to execute computer-readable instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, some or all of at least the herein-described functionality of devices, networks, methods, diagrams, images, equations, and/or scenarios. In some embodiments, computer-readable instructions 210 can include at least instructions for neural network software 212. Neural network software 212 can include software and/or firmware for providing neural-network-related and/or machine-learning-algorithm-related functionality; e.g., some or all of at least the functionality described in the context of an artificial neural network, a convolutional neural network, a recurrent neural network, machine learning algorithm 340, predictive model 360, networks 400, 500, 700, 750, 1100, 1150, pipelines 600, 800, 1200, and methods 900, 1300.

III. EXAMPLE NEURAL NETWORKS

Figure 3:
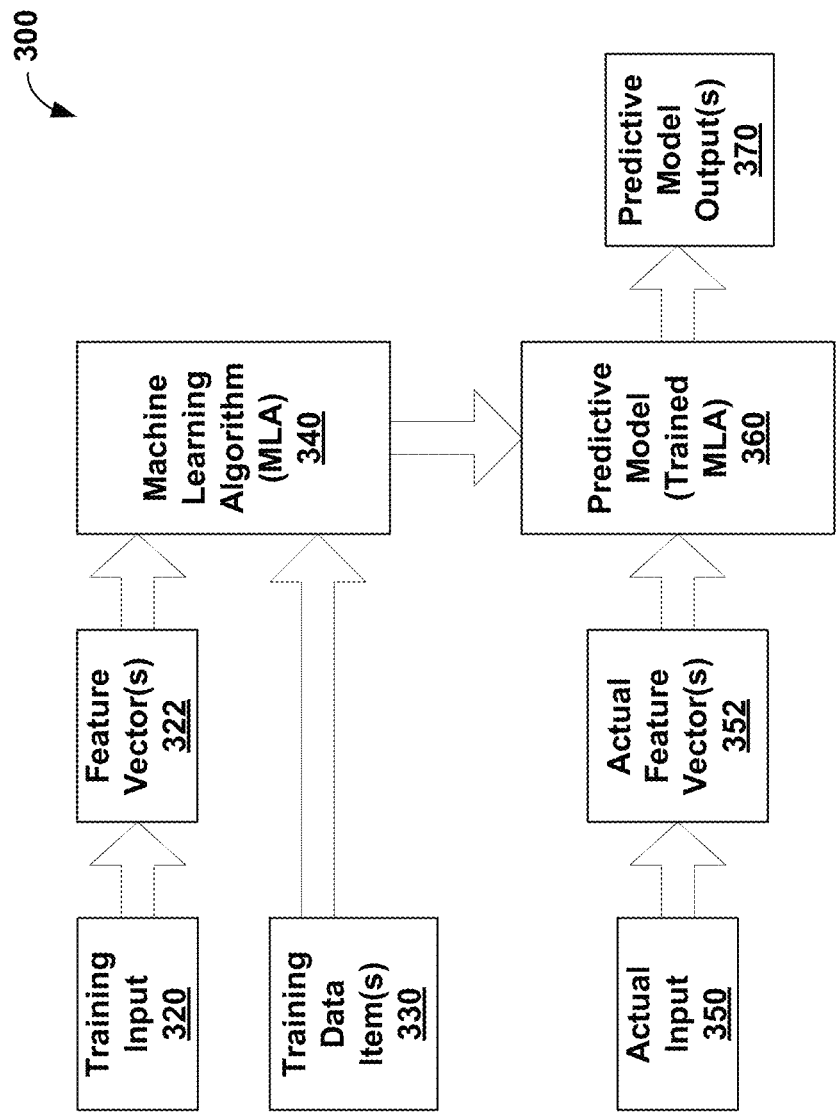
FIG. 3 is a diagram of a supervised learning pipeline, according to example embodiments.

FIG. 3 is a diagram of a supervised learning pipeline 300, according to example embodiments. Supervised learning pipeline 300 includes training input 320, one or more feature vectors 322, one or more training data items 330, machine learning algorithm 340, actual input 350, one or more actual feature vectors 352, predictive model 360, and one or more predictive model outputs 370. Part or all of supervised learning pipeline 300 can be implemented by executing software for part or all of supervised learning pipeline 300 on one or more processing devices and/or by using other circuitry (e.g., specialized hardware for carrying out part or all of supervised learning pipeline 300).

In operation, supervised learning pipeline 300 can involve two phases: a training phase and a prediction phase. The training phase can involve machine learning algorithm 340 learning one or more tasks. The prediction phase can involve predictive model 360, which can be a trained version of machine learning algorithm 340, making predictions to accomplish the one or more tasks. In some examples, machine learning algorithm 340 and/or predictive model 360 can include, but are not limited, to one or more: artificial neural networks (ANNs), deep neural networks, convolutional neural networks (CNNs), recurrent neural networks, support vector machines (SVMs), Bayesian networks, genetic algorithms, linear classifiers, non-linear classifiers, algorithms based on kernel methods, logistic regression algorithms, linear discriminant analysis algorithms, and/or principal components analysis algorithms.

During the training phase of supervised learning pipeline 300, training input 320 can be processed to determine one or more feature vectors 322. In some examples, training input 320 can be preprocessed; e.g., for image de-noising tasks or super resolution tasks.

In some examples, some or all of training input 320 includes one or more images. The images could include, for example, images collected by a printing device provider that exhibit known quality issues, such as resolution related issues or noise related issues. In some cases, training input 320 can include images collected from web scrapers configured to retrieve images exhibiting known quality issues from public image datasets or the Internet. In some cases, training input 320 can contain several "normal" images that exhibit no known quality issues.

Feature vector(s) 322 can be provided to machine learning algorithm 340 to learn one or more tasks. After performing the one or more tasks, machine learning algorithm 340 can generate one or more outputs based on feature vector(s) 322 and perhaps training input 320. During training, training data item(s) 330 can be used to make an assessment of the output(s) of machine learning algorithm 340 for accuracy and machine learning algorithm 340 can be updated based on this assessment. Training of machine learning algorithm 340 can continue until machine learning algorithm 340 is considered to be trained to perform the one or more tasks. Once trained, machine learning algorithm 340 can be considered to be a predictive model, such as predictive model 360.

During the prediction phase of supervised learning pipeline 300, actual input 350 can be processed to generate one or more actual feature vectors 352. In some examples, some or all of actual input 350 includes one or more actual images. Actual input 350 can be provided to predictive model 360 via actual feature vector(s) 352. Predictive model 360 can generate one or more outputs, such as predictions, based on actual input 350. The output(s) of predictive model 360 can then be provided as predictive model output(s) 370. In some examples, predictive model 360 can receive a request to make one or more predictions, and reception of the request can trigger predictive model 360 to generate predictive model output(s) 370 based on actual input 350 and/or actual feature vector(s) 352. In some of these examples, the request can include and/or refer to actual input 350.

In some examples, machine learning algorithm 340 can be trained on one or more training computing devices and predictive model 360 can be executed on the same training computing device(s). In some examples, machine learning algorithm 340 can be trained on the training computing device(s). Then, after training, now-trained machine learning algorithm 340 can be communicated as predictive model 360 from the training computing device(s) to one or more other computing devices that can execute predictive model 360 to operate on actual input 350 to generate predictive model output(s) 370.

IV. EXAMPLE IMAGE ARTIFACTS

Figure 4A:
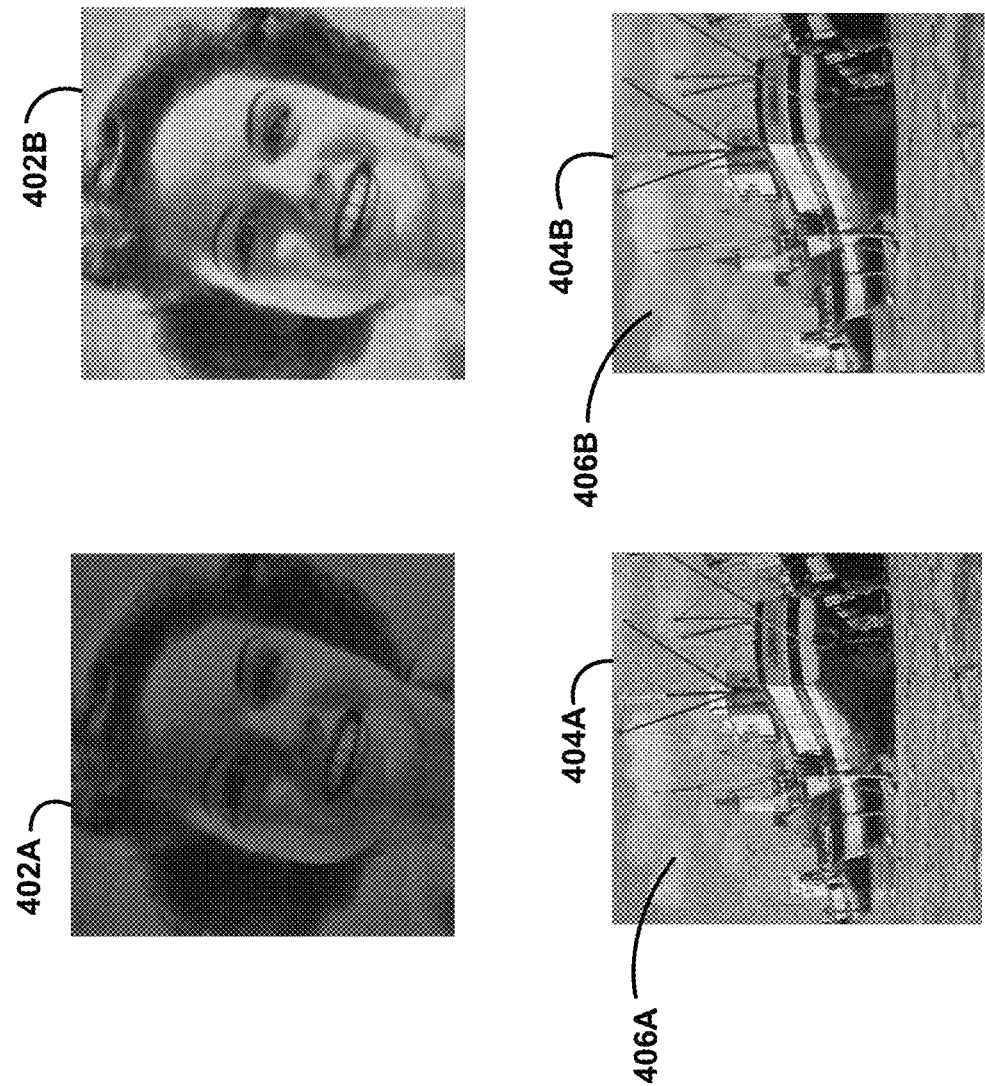
FIGS. 4A and 4B depict various image artifacts, according to example embodiments.
Figure 4B:
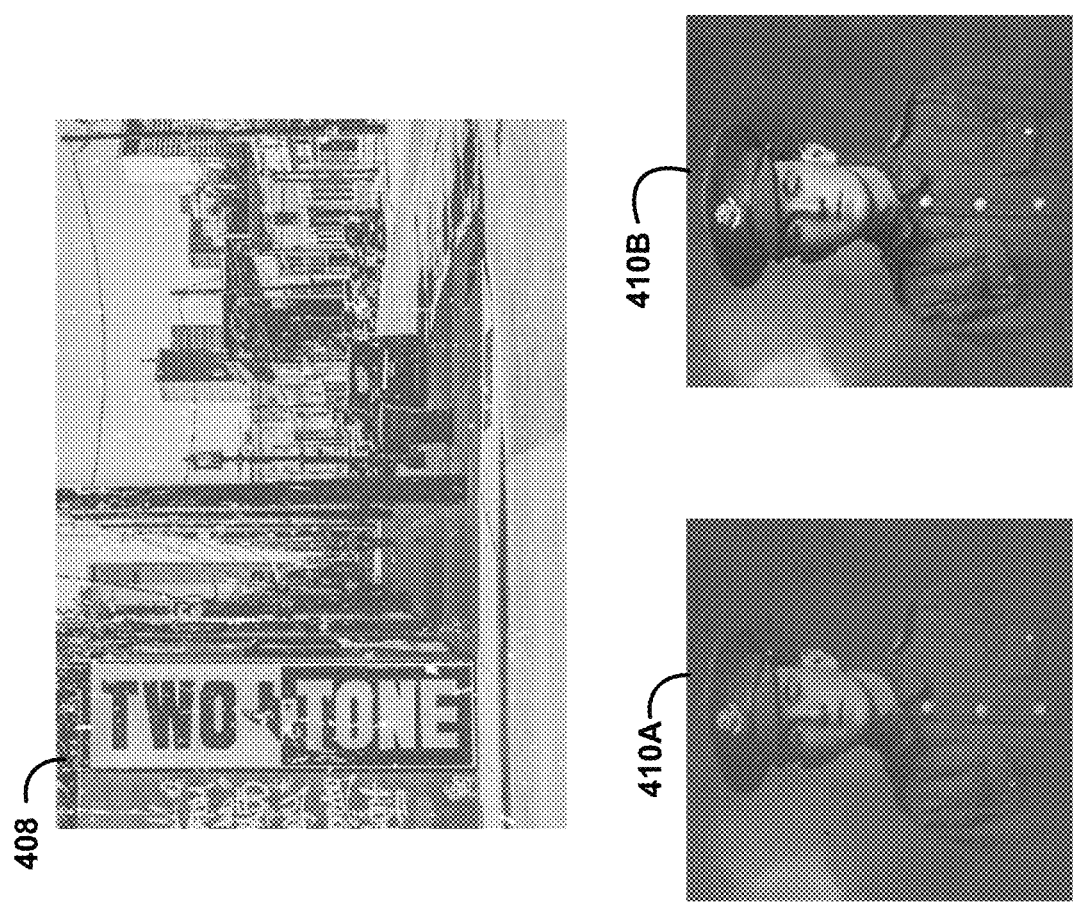

FIGS. 4A and 4B illustrate various images that exhibit some artifacts (e.g., deformities and quality issues), in accordance with example embodiments. The images in FIGS. 4A and 4B include image 402A, image 402B, image 404A, image 404B, image 408, image 410A, and image 410B.

Images 402A and 402B could be images associated with lighting quality issues. Such lighting quality issues can be illustrated by comparing image 402A, which exhibits a woman photographed under inadequate lighting, to image 402B, which exhibits the same woman photographed under adequate lighting. One solution to resolve the lighting quality issue illustrated in image 402A can be to increase the overall lighting of image 402A with a histogram equalization process. Other solutions to resolve lighting quality issues are possible as well.

Images 404A and 404B are images associated with salt-and-pepper noise. Such salt-and-pepper noise can be illustrated by comparing image 404A, which exhibits an image of a boat with salt-and-pepper noise, to image 404B, which exhibits the same boat with no salt-and-pepper noise. In particular, region 406A of image 404A shows "salt and peppers" or sparsely occurring white and black pixels that take detail and clarity away from the image, whereas corresponding region 406B of image 404B does not have "salt and peppers". One solution to resolve the salt-and-pepper noise illustrated in image 404A can be to reduce the overall noise of image 404A with a de-noising process. Other solutions to resolve salt-and-pepper noise are possible as well.

Image 408 is an image associated with dust-and-scratch noise. Such dust-and-scratch noise can be seen in image 408 in the form of skinny, white slashes that are spread throughout image 408. One solution to resolve the dust-and-scratch noise illustrated in image 408 can be to apply an ANN restoration model that removes the dust-and-scratch noise from image 408. Other solutions to resolve dust-and-scratch noise are possible as well.

Images 410A and 410B are images associated with fading degradation. Such fading degradation can be illustrated by comparing image 410A, which exhibits a person with fading degradation, to image 410B, which exhibits the same person with no fading degradation. As shown, image 410A has a narrow color contrast, whereas image 410B has a wide color contrast. One solution to resolve the fading degradation illustrated in image 410A can be to increase the overall contrast of image 410A with a de-fading process that involves remapping the tone histogram of image 410A to a broader range. Other solutions to resolve fading degradation are possible as well.

Notably, the images depicted in FIGS. 4A and 4B are provided merely for the purpose of example and are not intended to be limiting with respect to the embodiments herein. In practice, images exhibiting other types of artifacts may exist.

V. EXAMPLE IMAGE PROCESSING TECHNIQUES

Figure 5:
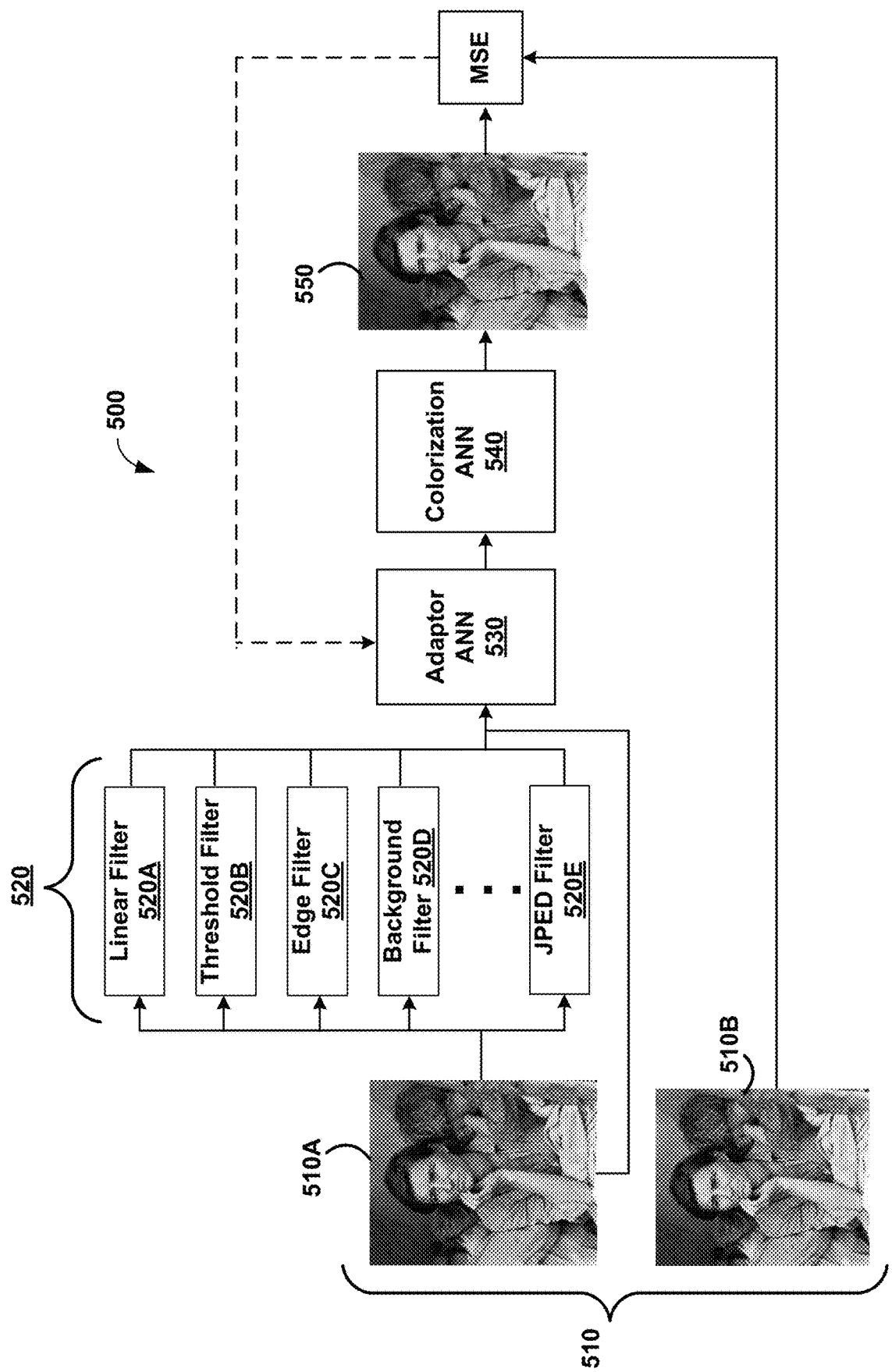
FIG. 5 is a diagram of a process, according to example embodiments.

FIG. 5 is a diagram of process 500, according to example embodiments. As shown, process 500 includes input image pair 510, one or more image filtering modules 520, adaptor ANN 530, colorization ANN 540, and colorized image 550. Part or all of process 500 can be implemented by executing software for part or all of process 500 on one or more processing devices and/or by using other circuitry (e.g., specialized hardware for carrying out part or all of process 500).

Process 500 may begin with various instances (e.g. unique copies) of training image 510A being provided to image filtering module(s) 520. In other words, each of image filtering module(s) 520 may receive a particular instance of training image 510A. In line with the discussion above, training image 510A may correspond to a colorless image, and ground truth image 510B may correspond to a colorized version of training image 510A. In some examples, training image 510A is generated by randomly adding various defects/artifacts to ground truth image 510B.

Image filtering module(s) 520 could include a variety of image filters that can correct a particular defect/artifact exhibited in training image 510A, such as the defects/artifacts described above in reference to FIGS. 4A and 4B. For example, image filtering module(s) 520 could include linear filter module 520A, threshold filter module 520B, edge filter module 520C, background filter module 520D, and JPEG filter module 520E. Image filtering module(s) could also include other types of modules, such as a morphological filter module, a blur filter module, and median filter module, among other possibilities. The filtering modules in image filtering module(s) 520 could be implemented using machine learning models (e.g., a trained machine learning algorithm 340), non-machine learning computational models, or in other ways. In some embodiments, each filtering module in image filtering module(s) 520 is configured to apply a different image filter on training image 510A. In other embodiments, two or more of image filtering module(s) 520 may apply the same image filter on training image 510A.

Upon receiving an instance of training image 510A, each of image filtering module(s) 520 could process the received instance of training image 510A to produce a filtered representation of training image 510A. In some implementations, the filtered representation of training image 510A is a residue image. That is, the filtered representation of training image 510A may be a difference between training image 510A and training image 510A after having been transformed by the respective image filtering module. After generating the filtered representations of training image 510A, each of image filtering module(s) 520 could respectively provide their filtered representations of training image 510A to adaptor ANN 530.

Adaptor ANN 530 could take the form of a convolution neural network (CNN) (e.g., a machine learning algorithm 340) that is configured to receive an input image and correspondingly generate a defect-free/artifact-free representation of that input image. To do this, adaptor ANN 530 may perform concatenation, convolution, activation, pooling, or inference tasks using a combination of concatenation layers, convolution layers, activation layers, pooling layers, and fully connected layers.

Generally speaking, a convolution layer includes one or more filters used to filter respective inputs. Each filter works over a subset of an input image or volume. For example, suppose an input to a convolutional layer was a 100×100 pixel image in CMYK format (Z=4). As such, the convolution layer would receive the 100×100×4 volume of pixels as an input volume and would convolve a 3×3×4 filter over the 100×100×4 volume. To do this, the convolution layer would slide the filter across the width and height of the input volume and compute dot products between the entries of the filter and the input at each position that the filter is on the input volume. As the convolution layer slides the filter, the filter generates a 2-dimensional feature map that gives the responses of that filter at every spatial position of the input volume. Multiple such filters could be used in a given convolution layer to produce multiple 2-dimensional feature maps. Further, multiple 2-dimensional feature maps could be combined to form a 3-dimensional feature map.

The output of the convolution layer (e.g., the feature maps mentioned above) can be provided as an input to an activation layer. The activation layer may be applied to determine which values of the feature map are to be provided to a subsequent layer. More generally, the activation function can determine whether the output of the convolution layer (e.g., the feature map) is to be provided to a subsequent layer. Activation layers could utilize sigmoid/logistic activation functions, hyperbolic tangent activation functions, or rectified linear unit (ReLU) functions, among other possibilities.

The number of layers in adaptor ANN 530 and the dimensions of those layers may vary. In some embodiments, the number of layers in adaptor ANN 530 and the dimensions of those layers could depend on the size and number of layers in colorization ANN 540. Additionally and/or alternatively, the number of layers in adaptor ANN 530 and the dimensions of those layers could depend on the number of filtering modules in image filtering module(s) 520. In some examples, the output layer of adaptor ANN 530 has the same dimensions as the input layer of colorization ANN 540. Further, in certain examples, adaptor ANN 530 could include one or more inception snippet layers.

In various examples, adaptor ANN 530 could include an input layer that is configured to receive, from image filtering module(s) 520, respective filtered representations of training image 510A and then concatenate those respective filtered representations. Further, in some examples, the input layer of adaptor ANN 530 is configured to receive an instance of training image 510A and concatenate the instance of training image 510A with the respective filtered representations of training image 510A. Either which way, the concatenated result could be passed from the input layer to subsequent layers of adaptor ANN 530.

During process 500, adaptor ANN 530 could determine an adapted representation of training image 510A, which may be a defect-free/artifact-free representation of training image 510A. After determining the adapted representation, adaptor ANN 530 could provide the adapted representation to colorization ANN 540.

In accordance with the disclosure, colorization ANN 540 could be a trained ANN (e.g., a trained machine learning algorithm 340) configured to receive colorless input images and correspondingly generate colorized versions of those colorless input images. In example embodiments, colorization ANN 540 could be trained using supervised learning pipeline 300, as described above with reference to FIG. 3.

Much like adaptor ANN 530, colorization ANN 540 could take the form of a CNN and could perform convolution, activation, or inference tasks using a combination of convolution layers, activation layers, and fully connected layers. The number of layers in colorization ANN 540 and the dimensions of those layers may vary. In some embodiments, the number of layers in colorization ANN 540 and the dimensions of those layers depend on the size and number of layers in adaptor ANN 530. In some examples, the input layer of colorization ANN 540 has the same dimensions as the output layer of adaptor ANN 530.

Upon receiving the adapted representation of training image 510A from adaptor ANN 530, colorization ANN 540 could perform computations on the adapted representation and generate colorized image 550, which may be a colorized version of the adapted representation of training image 510A. After generating colorized image 550, process 500 may continue by computationally updating the weights of adaptor ANN 530 based on a loss function that includes a difference between colorized image 550 and ground truth image 510B. In some implementations, the difference between colorized image 550 and ground truth image 510B is pixel-wise difference. That is, pixels in colorized image 550 may be compared to corresponding pixels in ground truth image 510B to determine the extent to which the weights in adaptor ANN 530 need to be updated.

Process 500 may continue for a plurality of image pairs. In some embodiments, process 500 may continue until the occurrence of one or more training termination criteria at adaptor ANN 530. The training termination criteria can include, but are not limited to, when the error determined by the loss function is less than a predetermined threshold value, the change in the error determined by the loss function is sufficiently small between consecutive iterations of training, or a pre-determined maximum number of iterations has been reached, among other possibilities.

Once adaptor ANN 530 is deemed to be trained (e.g., after one or more training termination criteria have been satisfied), in some implementations, a second process could be initiated to "fine tune" image filtering module(s) 520, the weights of adaptor ANN 530, and the weights of colorization ANN 540. In this second process, various instances of a second training image could be provided to image filtering module(s) 520. The second training image may be part of a second image pair that includes a second ground truth image. Similar to process 500, image filtering module(s) 520 may determine respective filtered representations of the second training image and may provide the respective filtered representations to adaptor ANN 530. After receiving the respective filtered representations, adaptor ANN 530 could perform computations on the respective filtered representations (as well as the second training image) and provide its results to colorization ANN 540. Then, colorization ANN 540 may perform computations on the results from adaptor ANN 530. However, unlike process 500, instead of merely computationally updating the weights of adaptor ANN 530 based on a difference between the output of colorization ANN 540 and the second ground truth image, the second process may computationally update the weights of image filtering module(s) 520, adaptor ANN 530, and colorization ANN 540 based on the difference between the output of colorization ANN 540 and the second ground truth image.

Further, in some embodiments, after training is complete (e.g., after process 500 is complete or after the second process described above is complete), image filtering module(s) 520, adaptor ANN 530, and colorization ANN 540 may each be provided to a printing device, such as printing device 110 described in reference to FIG. 1. Upon receiving image filtering module(s) 520, adaptor ANN 530, and colorization ANN 540, the printing device could use image filtering module(s) 520, adaptor ANN 530, and colorization ANN 540 to process a colorless image during one or more printing processes. Alternatively, rather than being provided to the printing device, image filtering module(s) 520, adaptor ANN 530, and colorization ANN 540 may be provided to a remote computing device commutatively coupled to the printing device. In such a scenario, the printing device may communicate with the remote computing device to use the services of image filtering module(s) 520, adaptor ANN 530, and colorization ANN 540.

VI. EXAMPLE OPERATIONS FOR PROCESSING IMAGES

Figure 6:
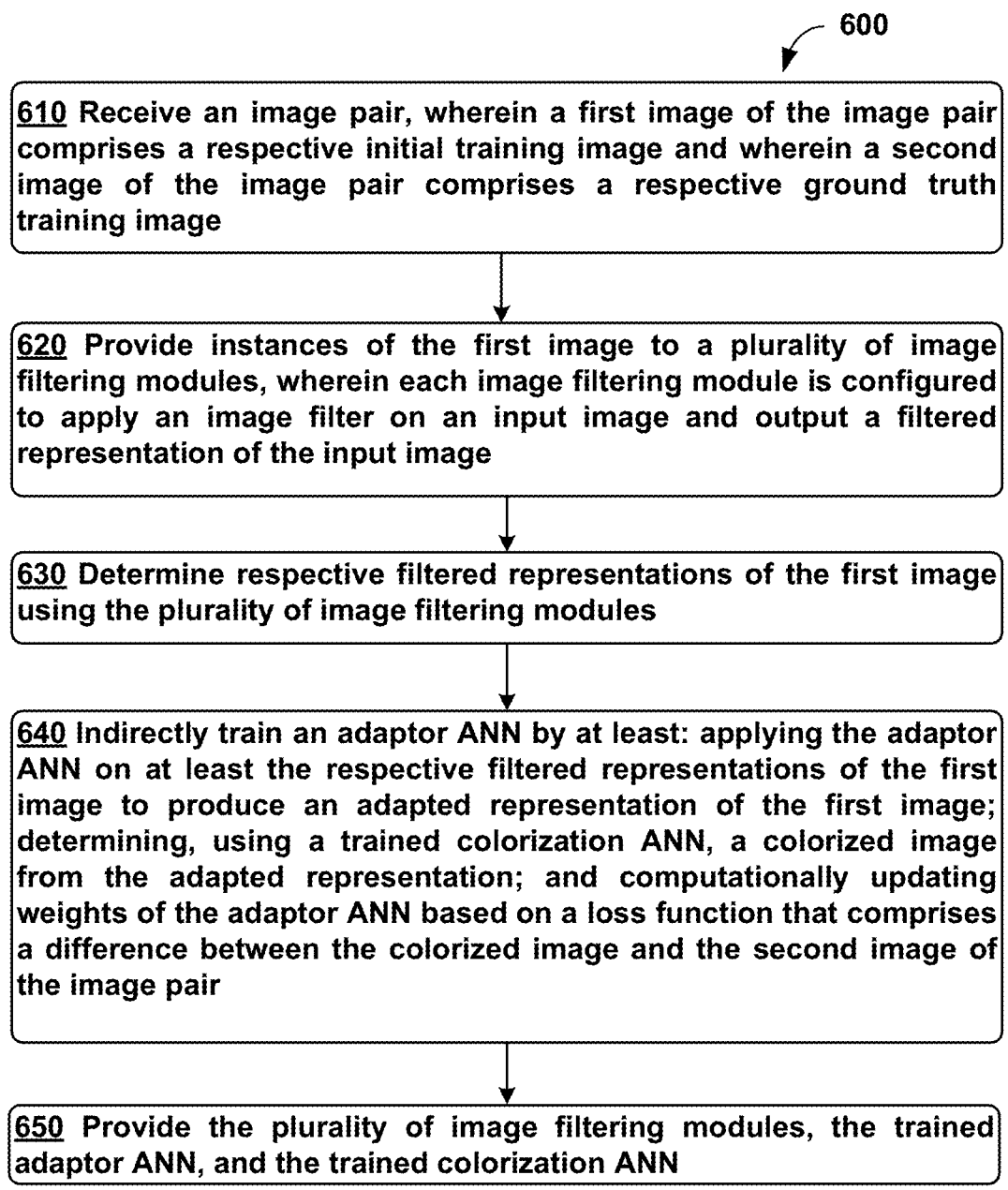
FIG. 6 shows a flowchart for a method, according to example embodiments.

FIG. 6 shows a flowchart for method 600, according to example embodiments. Method 600 can be carried out by a computing device, such as computing device 200. Method 600 could also be carried out by other types of devices or device subsystems. For example, method 600 could be carried out by a printing device in printing network 100 or a portable computer, such as a laptop or a tablet device.

The embodiments of FIG. 6 may be simplified by the removal of any one or more of the features shown therein. Further, these embodiments may be combined with features, aspects, and/or implementations of any of the previous figures or otherwise described herein FIG. 6 shows that method 600 can begin at block 610, where the computing device receives an image pair. A first image of the image pair could include a respective initial training image and a second image of the image pair could include a respective ground truth training image.

At block 620, the computing device provides instances of the first image to a plurality of image filtering modules. Each of the image filtering modules could be configured to apply an image filter on an input image and output a filtered representation of the input image At block 630, the computing device determines respective filtered representations of the first image using the plurality of image filtering modules.

At block 640, the computing device indirectly trains an adaptor ANN. The indirect training could include applying the adaptor ANN on at least the respective filtered representations of the first image to produce an adapted representation of the first image. The indirect training could also include determining, using a trained colorization ANN, a colorized image from the adapted representation. The indirect training could further include computationally updating weights of the adaptor ANN based on a loss function that comprises a difference between the colorized image and the second image of the image pair.

At block 650, the computing device provides the plurality of image filtering modules, the trained adaptor ANN, and the trained colorization ANN.

In some embodiments, the adaptor ANN comprises an input layer that is configured to receive and concatenate the respective filtered representations of the first image.

In some embodiments, the input layer is further configured to receive an instance of the first image and concatenate the respective filtered representations with the instance of the first image.

In some embodiments, the filtered representation of the input image comprises a difference between the input image and the input image after having been transformed by the image filter.

Some embodiments involve, after indirectly training the adaptor ANN, further training the plurality of image filtering modules, the trained adaptor ANN, and the trained colorization ANN. The further training could include receiving a second image pair, where a first image of the second image pair comprises a respective second initial training image and where a second image of the second image pair comprises a respective second ground truth training image. The further training could additionally include providing instances of the first image of the second image pair to the plurality of image filtering modules. The further training could also include determining respective filtered representations of the first image of the second image pair using the plurality of image filtering modules. The further training could further include applying the trained adaptor ANN on at least the respective filtered representations of the first image of the second image pair to produce a second adapted representation. The further training could also include determining, using the trained colorization ANN, a second colorized image from the second adapted representation. The further training could additionally include computationally updating weights of the plurality of image filtering modules, the indirectly trained adaptor ANN, and the trained colorization ANN based on a loss function that comprises a difference between the second colorized image and the second image of the second image pair.

In some embodiments, the image pair is part of a plurality of image pairs. In such embodiments, the receiving, providing, determining, and indirect training are also applied to each of the plurality of image pairs.

In some embodiments, the difference between the colorized image and the second image of the image pair comprises a pixel-wise difference between the colorized image and the second image of the image pair.

In some embodiments, the trained colorization ANN is trained to receive a colorless image and correspondingly output a colorized version of the colorless image.

In some embodiments, the providing comprises providing the plurality of image filtering modules, the trained adaptor ANN, and the trained colorization ANN to a printing device.

In some embodiments, the second image of the image pair comprises a colorized version of the first image of the image pair.

In some embodiments, each image filtering module from the plurality of image filtering modules is configured to apply a different image filter.

In some embodiments, the plurality of image filtering modules comprise at least one of: a morphological filter, a blur filter, or a median filter.

VII. EXAMPLE DOCUMENT ARTIFACTS

Figure 7A:
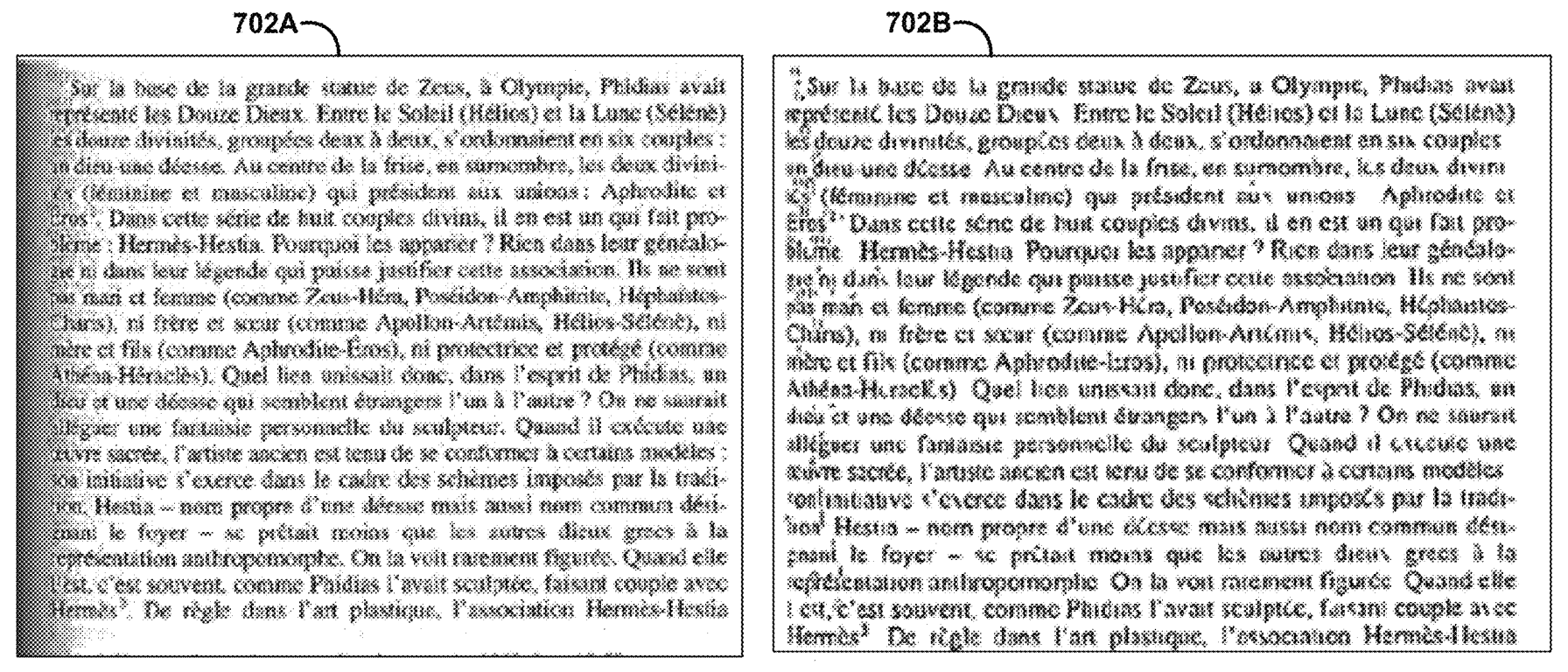
Figure 7B:
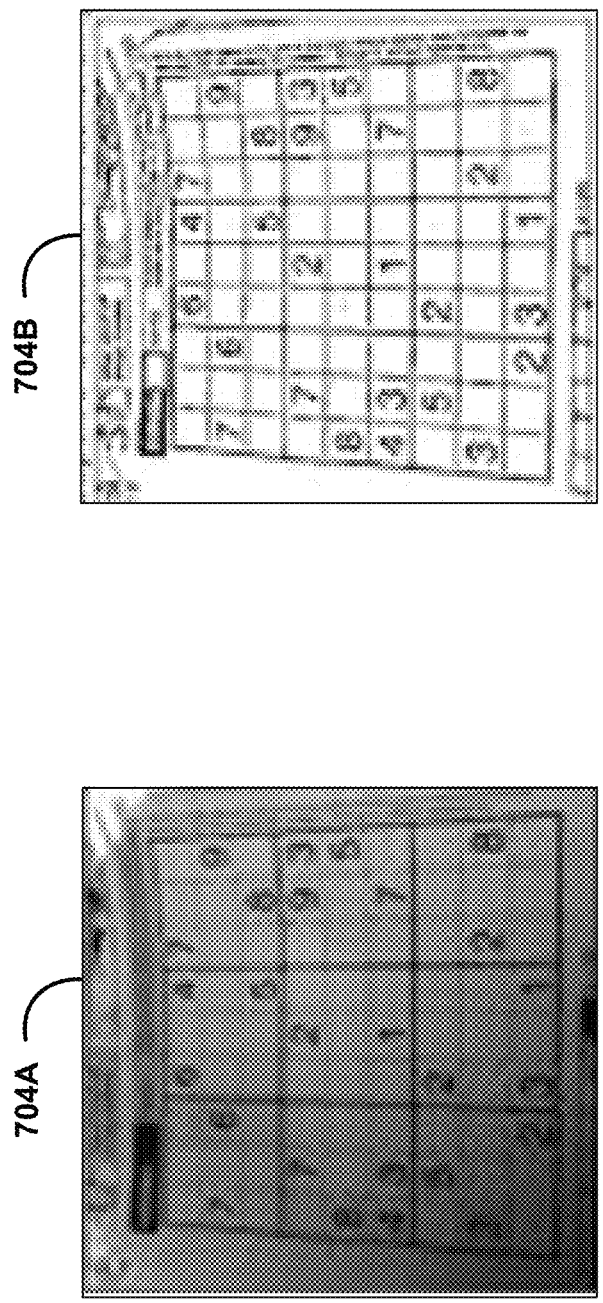

FIGS. 7A and 7B illustrate various documents that exhibit some artifacts (e.g., deformities and quality issues), in accordance with example embodiments. The documents in FIGS. 7A and 7B include document 702A, document 702B, document 704A, and document 704B.

Documents 702A and 702B are documents associated with salt-and-pepper noise. Such salt-and-pepper noise can be illustrated by comparing document 702A, which contains salt-and-pepper noise, to document 702B, which contains no salt-and-pepper noise. In particular, the left hand side of document 702A has "salt and peppers" or sparsely occurring white and black pixels that take detail and clarity away from the document, whereas the left hand side of document 702B does not have salt-and-pepper noise. One solution to resolve the salt-and-pepper noise illustrated in document 702A can be to reduce the overall noise of document 702A with a morphological filter. Other solutions to resolve salt-and-pepper noise are possible as well.

Documents 704A and 704B could be documents associated with unbalanced background issues. Such unbalanced background issues can be illustrated by comparing document 704A, which contains a Sudoku puzzle with an unbalanced background, to document 704B, which contains the same Sudoku puzzle with a balanced background. One solution to resolve the unbalanced background issue illustrated in document 704A can be to increase the overall lighting of document 704A with a histogram equalization process. Other solutions to resolve unbalanced background issues are possible as well.

Notably, the documents depicted in FIGS. 7A and 7B are provided merely for the purpose of example and are not intended to be limiting with respect to the embodiments herein. In practice, document exhibiting other types of defects/artifacts may exist.

VIII. EXAMPLE DOCUMENT PROCESSING TECHNIQUES

Figure 8:
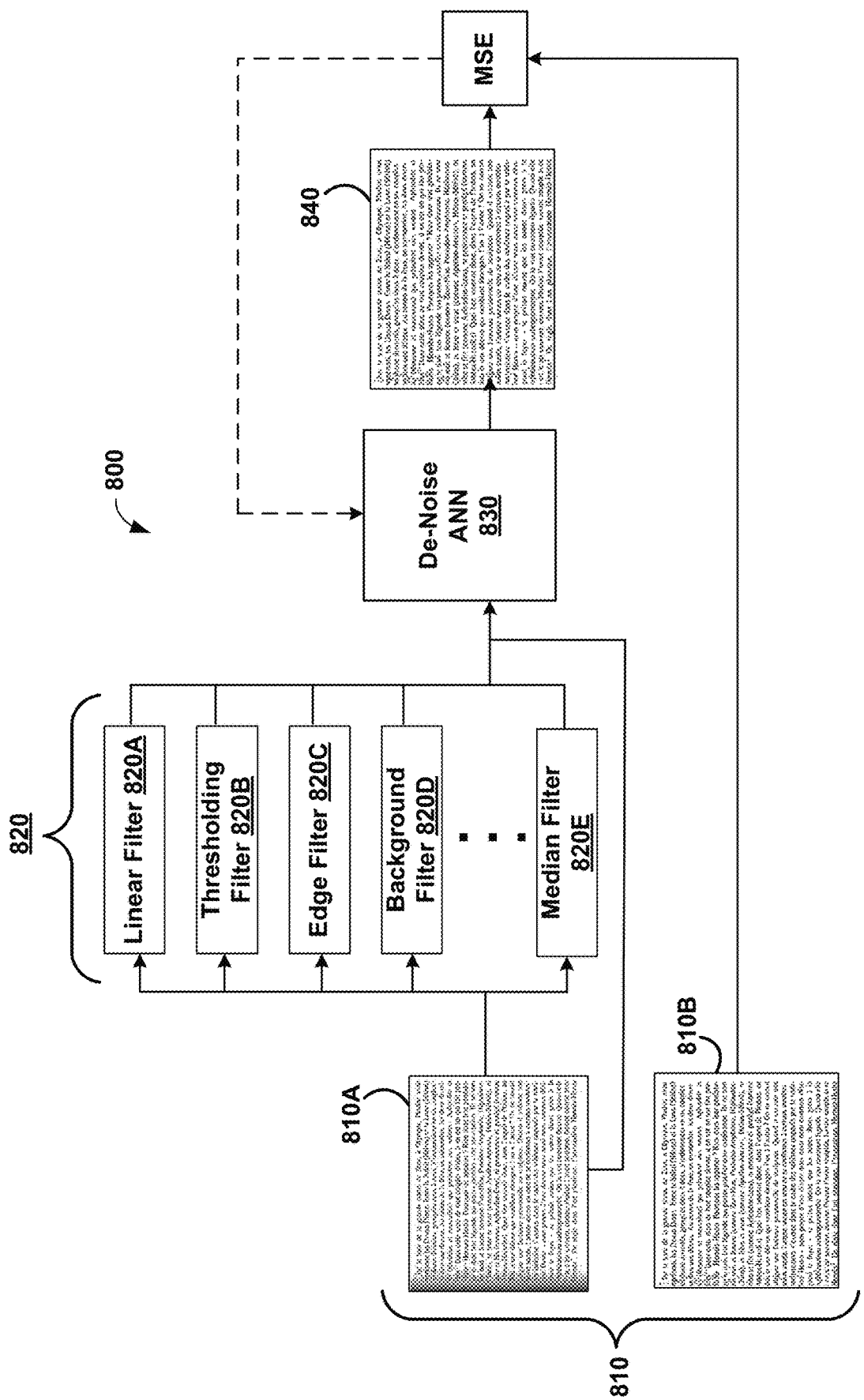
FIG. 8 is a diagram of a process, according to example embodiments.

FIG. 8 is a diagram of process 800, according to example embodiments. As shown, process 800 includes input document pair 810, one or more document filtering modules 820, de-noise ANN 830, and de-noised document 840. Part or all of process 800 can be implemented by executing software for part or all of process 800 on one or more processing devices and/or by using other circuitry (e.g., specialized hardware for carrying out part or all of process 800).

Process 800 may begin with various instances (e.g. unique copies) of training document 810A being provided to document filtering module(s) 820. In other words, each of document filtering module(s) 820 may receive a particular instance of training document 810A. In line with the discussion above, training document 810A may correspond to a document containing various defects/artifacts, and ground truth document 810B may correspond to a defect-free/artifact-free version of training document 810A. In some examples, training document 810A is generated by randomly adding various defects/artifacts to ground truth document 810B.

Document filtering module(s) 820 could include a variety of document filters that can correct a particular defect/artifact exhibited in training document 810A, such as the defects/artifacts described above in reference to FIGS. 7A and 7B. For example, document filtering module(s) 820 could include linear filter module 820A, threshold filter module 820B, edge filter module 820C, background filter module 820D, and JPEG filter module 820E. Document filtering module(s) 820 could also include other types of filtering modules, such as a morphological filter module, a blur filter module, and median filter module, among other possibilities. The filtering modules in document filtering module(s) 820 could be implemented using machine learning models (e.g., trained machine learning algorithm 340), non-machine learning computational models, or in other ways. In some embodiments, each filtering module in document filtering module(s) 820 is configured to apply a different document filter on training document 810A. In other embodiments, two or more of document filtering module(s) 820 may apply the same document filter on training document 810A.

Upon receiving an instance of training document 810A, each of document filtering module(s) 820 could process the received instance of training document 810A to produce a filtered representation of training document 810A. In some implementations, the filtered representation of training document 810A include a difference (e.g., a pixel-wise difference) between training document 810A and training document 810A after having been transformed by the respective document filtering module. After generating the filtered representations of training document 810A, each of document filtering module(s) 820 could respectively provide their filtered representations of training document 810A to de-noise ANN 830.

De-noise ANN 830 could take the form of a convolution neural network (CNN) (e.g., a machine learning algorithm 340) that is configured to receive an input image and correspondingly generate a defect-free/artifact-free representation of that input image. To do this, de-noise ANN 830 may perform concatenation, convolution, activation, pooling, or inference tasks using a combination of concatenation layers, convolution layers, activation layers, pooling layers, and fully connected layers.

The number of layers in de-noise ANN 830 and the dimensions of those layers may vary. In some embodiments, the number of layers in de-noise ANN 830 and the dimensions of those layers depend the number of document filtering module(s) 820. In certain examples, de-noise ANN 830 could include one or more inception snippet layers.

In various examples, de-noise ANN 830 could include an input layer that is configured to receive from document filtering module(s) 820 respective filtered representations of training document 810A and then concatenate those respective filtered representations. Further, in some examples, the input layer of de-noise ANN 830 is configured to receive an instance of training document 810A and concatenate the instance of training document 810A with the respective filtered representations of training document 810A. Either which way, the concatenated result could be passed from the input layer to subsequent layers of de-noise ANN 830.

During process 800, de-noise ANN 830 could generate de-noised document 840, which may be a defect-free/artifact-free representation of training document 810A. After de-noised document 840 has been generated, process 800 may continue by computationally updating weights of de-noise ANN 830 based on a loss function that includes a difference between de-noised document 840 and ground truth document 810B. In some implementations, the difference between de-noised document 840 and ground truth document 810B is pixel-wise difference. That is, pixels in a pixel representation of de-noised document 840 may be compared to corresponding pixels in a pixel representation of ground truth document 810B to determine the extent to which the weights in de-noise ANN 830 need to be updated.

Process 800 may continue for a plurality of document pairs. In some embodiments, process 800 may continue until the occurrence of one or more training termination criteria at de-noise ANN 830. The training termination criteria can include, but are not limited to, when the error determined by the loss function is less than a predetermined threshold value, the change in the error determined by the loss function is sufficiently small between consecutive iterations of training, or a pre-determined maximum number of iterations has been reached, among other possibilities.

Once de-noise ANN 830 is deemed to be trained (e.g., after one or more training termination criteria have been satisfied), in some implementations, a second process could be initiated to "fine tune" document filtering module(s) 820 and the weights of de-noise ANN 830. In this second process, instance of a second training document could be provided to document filtering module(s) 820. The second training document may be part of a document pair that includes a second ground truth document. Similar to process 800, document filtering module(s) 820 may determine respective filtered representations of the second training document and may provide the respective filtered representations to de-noise ANN 830. De-noise ANN 830 could perform computations on the respective filtered representations (as well as the second training document). However, unlike process 800, instead of merely computationally updating the weights of de-noise ANN 830 based on a difference between the output of de-noise ANN 830 and the second ground truth document, the second process may computationally update the weights of document filtering module(s) 820 and de-noise ANN 830 based on the difference between the output of de-noise ANN 830 and the second ground truth document.

Further, in some embodiments, after training is complete (e.g., after process 800 is complete or after the second process described above is complete), document filtering module(s) 820 and de-noise ANN 830 may each be provided to a printing device, such as printing device 110 described in reference to FIG. 1. Upon receiving document filtering module(s) 820 and de-noise ANN 830, the printing device could use document filtering module(s) 820 and de-noise ANN 830 to process documents during one or more printing processes. Alternatively, rather than being provided to the printing device, document filtering module(s) 820 and de-noise ANN 830 may be provided to a computing device executing an OCR process. Upon receiving document filtering module(s) 820 and de-noise ANN 830, the computing device could use document filtering module(s) 820 and de-noise ANN 830 to process documents during the OCR process.

IX. EXAMPLE OPERATIONS FOR PROCESSING DOCUMENTS

Figure 9:
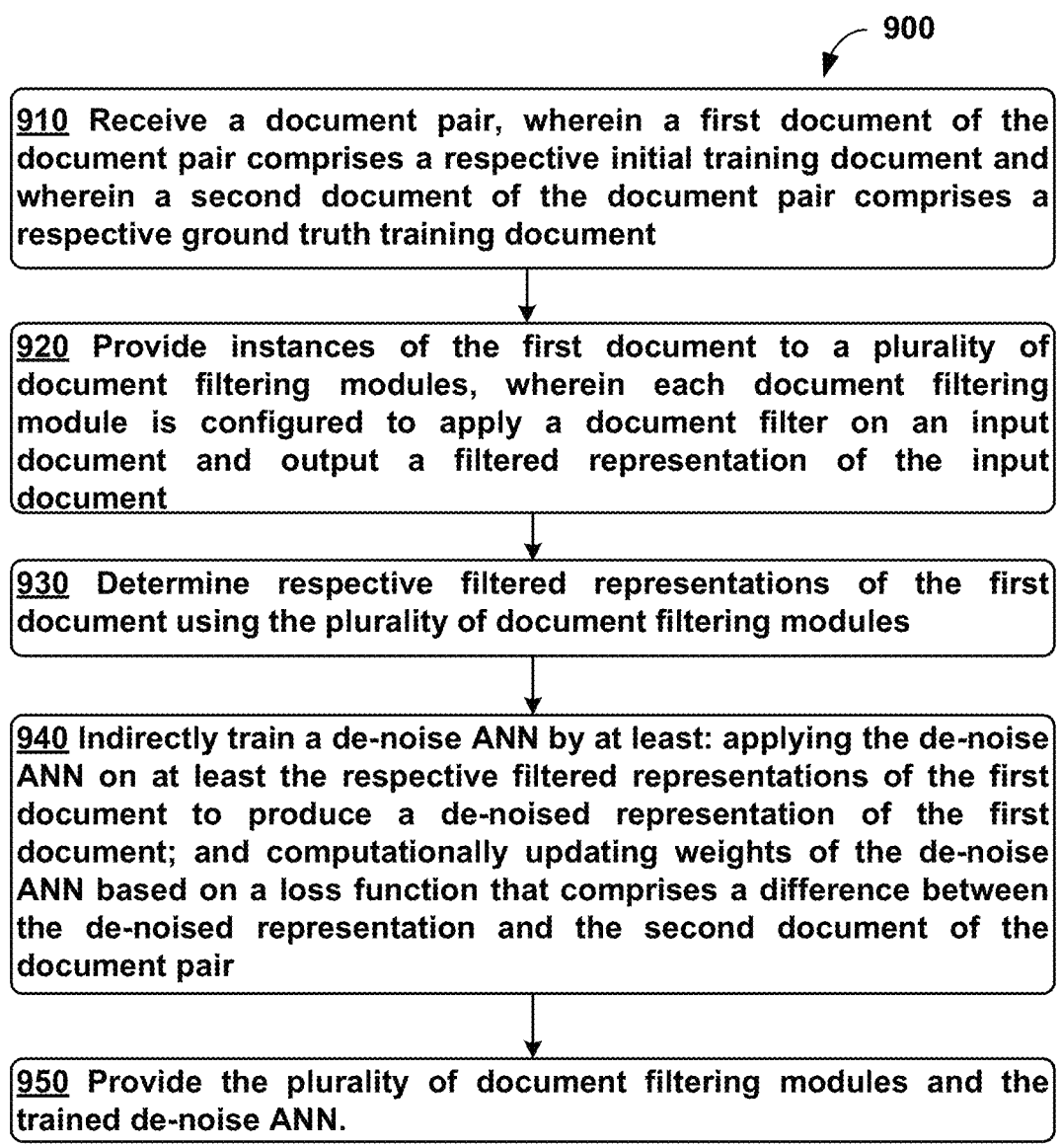
FIG. 9 shows a flowchart for a method, according to example embodiments.

FIG. 9 shows a flowchart for method 900, according to example embodiments. Method 900 can be carried out by a computing device, such as computing device 200. Method 900 could also be carried out by other types of devices or device subsystems. For example, method 900 could be carried out by a printing device in printing network 100 or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein FIG. 9 shows that method 900 can begin at block 910, where the computing device receives a document pair. A first document of the document pair could include a respective initial training document and a second document of the document pair could include a respective ground truth training document.

At block 920, the computing device provides instances of the first document to a plurality of document filtering modules. Each of the document filtering modules could be configured to apply a document filter on an input document and output a filtered representation of the input document.

At block 930, the computing device determines respective filtered representations of the first document using the plurality of document filtering modules.

At block 940, the computing device trains a de-noise ANN. The training could include applying the de-noise ANN on at least the respective filtered representations of the first document to produce a de-noised representation of the first document. The training could also include computationally updating weights of the de-noise ANN based on a loss function that comprises a difference between the de-noised representation and the second document of the document pair.

At block 950, the computing device provides the plurality of document filtering modules and the trained de-noise ANN.

In some embodiments, the de-noise ANN comprises an input layer that is configured to receive and concatenate the respective filtered representations of the first document.

In some embodiments, the input layer is further configured to receive an instance of the first document and concatenate the respective filtered representations with the instance of the first document.

In some embodiments, the filtered representation of the input document comprises a difference between the input document and the input document after having been transformed by the document filter.

In some embodiments, the document pair is part of a plurality of document pairs. In such embodiments, the receiving, providing, determining, and training are also applied to each of the plurality of document pairs.

In some embodiments, the difference between the de-noised representation and the second document of the document pair comprises a pixel-wise difference between the de-noised representation and the second document of the document pair.

In some embodiments, the providing comprises providing the plurality of document filtering modules and the trained de-noise ANN to a printing device.

In some embodiments, the second document of the document pair comprises a de-noised version of the first document of the document pair.

In some embodiments, each document filtering module from the plurality of document filtering modules is configured to apply a different document filter.

In some embodiments, the plurality of document filtering modules comprise at least one of: a histogram equalization filter, a morphological filter, or a median filter.

X. CONCLUSION

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:

receiving, at a computing device, an image pair, wherein a first image of the image pair comprises a respective initial training image and wherein a second image of the image pair comprises a respective ground truth training image;

providing, by the computing device, instances of the first image to a plurality of image filtering modules, wherein each image filtering module is configured to apply an image filter on an input image and output a filtered representation of the input image;

determining, by the computing device, respective filtered representations of the first image using the plurality of image filtering modules;

indirectly training, by the computing device, an adaptor artificial neural network (ANN) by at least:

applying the adaptor ANN on at least the respective filtered representations of the first image to produce an adapted representation of the first image;

determining, using a trained colorization ANN, a colorized image from the adapted representation; and computationally updating weights of the adaptor ANN based on a loss function that comprises a difference between the colorized image and the second image of the image pair; and providing, using the computing device, the plurality of image filtering modules, the trained adaptor ANN, and the trained colorization ANN.

2. The computer-implemented method of claim 1, wherein the adaptor ANN comprises an input layer that is configured to receive and concatenate the respective filtered representations of the first image.

3. The computer-implemented method of claim 2, wherein the input layer is further configured to receive an instance of the first image and concatenate the respective filtered representations with the instance of the first image.

4. The computer-implemented method of claim 1, wherein the filtered representation of the input image comprises a difference between the input image and the input image after having been transformed by the image filter.

5. The computer-implemented method of claim 1, further comprising:

after indirectly training the adaptor ANN, further training the plurality of image filtering modules, the trained adaptor ANN, and the trained colorization ANN by at least:

receiving a second image pair, wherein a first image of the second image pair comprises a respective second initial training image and wherein a second image of the second image pair comprises a respective second ground truth training image;

providing instances of the first image of the second image pair to the plurality of image filtering modules;

determining respective filtered representations of the first image of the second image pair using the plurality of image filtering modules;

applying the trained adaptor ANN on at least the respective filtered representations of the first image of the second image pair to produce a second adapted representation;

determining, using the trained colorization ANN, a second colorized image from the second adapted representation; and computationally updating weights of the plurality of image filtering modules, the indirectly trained adaptor ANN, and the trained colorization ANN based on a loss function that comprises a difference between the second colorized image and the second image of the second image pair.

6. The computer-implemented method of claim 1, wherein the image pair is part of a plurality of image pairs, and wherein the receiving, providing, determining, and indirect training are also applied to each of the plurality of image pairs.

7. The computer-implemented method of claim 1, wherein the difference between the colorized image and the second image of the image pair comprises a pixel-wise difference between the colorized image and the second image of the image pair.

8. The computer-implemented method of claim 1, wherein the trained colorization ANN is trained to receive a colorless image and correspondingly output a colorized version of the colorless image.

9. The computer-implemented method of claim 1, wherein the providing comprises providing the plurality of image filtering modules, the trained adaptor ANN, and the trained colorization ANN to a printing device.

10. The computer-implemented method of claim 1, wherein the second image of the image pair comprises a colorized version of the first image of the image pair.

11. The computer-implemented method of claim 1, wherein each image filtering module from the plurality of image filtering modules is configured to apply a different image filter.

12. The computer-implemented method of claim 1, wherein the plurality of image filtering modules comprise at least one of: a morphological filter, a blur filter, or a median filter.

13. A computing device, comprising:

one or more processors; and non-transitory data storage storing at least computer-readable instructions that, when executed by the one or more processors, cause the computing device to perform operations comprising:

receiving an image pair, wherein a first image of the image pair comprises a respective initial training image and wherein a second image of the image pair comprises a respective ground truth training image;

providing instances of the first image to a plurality of image filtering modules, wherein each image filtering module is configured to apply an image filter on an input image and output a filtered representation of the input image;

determining respective filtered representations of the first image using the plurality of image filtering modules;

indirectly training an adaptor artificial neural network (ANN) by at least:

applying the adaptor ANN on at least the respective filtered representations of the first image to produce an adapted representation of the first image;

determining, using a trained colorization ANN, a colorized image from the adapted representation; and computationally updating weights of the adaptor ANN based on a loss function that comprises a difference between the colorized image and the second image of the image pair; and providing the plurality of image filtering modules, the trained adaptor ANN, and the trained colorization ANN.

14. The computing device of claim 13, wherein the adaptor ANN comprises an input layer that is configured to receive and concatenate the respective filtered representations of the first image.

15. The computing device of claim 14, wherein the input layer is further configured to receive an instance of the first image and concatenate the respective filtered representations with the instance of the first image.

16. The computing device of claim 13, wherein the filtered representation of the input image comprises a difference between the input image and the input image after having been transformed by the image filter.

17. The computing device of claim 13, wherein the operations further comprise:
- after indirectly training the adaptor ANN, further training the plurality of image filtering modules, the trained adaptor ANN, and the trained colorization ANN by at least:
  - receiving a second image pair, wherein a first image of the second image pair comprises a respective second initial training image and wherein a second image of the second image pair comprises a respective second ground truth training image providing instances of the first image of the second image pair to the plurality of image filtering modules;
  - determining respective filtered representations of the first image of the second image pair using the plurality of image filtering modules;
  - applying the trained adaptor ANN on at least the respective filtered representations of the first image of the second image pair to produce a second adapted representation;
  - determining, using the trained colorization ANN, a second colorized image from the second adapted representation; and
  - computationally updating weights of the plurality of image filtering modules, the trained adaptor ANN, and the trained colorization ANN based on a loss function that comprises a difference between the second colorized image and the second image of the second image pair.

18. The computing device of claim 13, wherein the difference between the colorized image and the second image of the image pair comprises a pixel-wise difference between the colorized image and the second image of the image pair.

19. The computing device of claim 13, wherein the trained colorization ANN is trained to receive a colorless image and correspondingly output a colorized version of the colorless image.

20. An article of manufacture comprising non-transitory data storage storing at least computer-readable instructions that, when executed by one or more processors of a computing device, cause the computing device to perform operations comprising:
- receiving an image pair, wherein a first image of the image pair comprises a respective initial training image and wherein a second image of the image pair comprises a respective ground truth training image;
- providing instances of the first image to a plurality of image filtering modules, wherein each image filtering module is configured to apply an image filter on an input image and output a filtered representation of the input image;
- determining respective filtered representations of the first image using the plurality of image filtering modules;
- indirectly training an adaptor artificial neural network (ANN) by at least:
  - applying the adaptor ANN on at least the respective filtered representations of the first image to produce an adapted representation of the first image;
  - determining, using a trained colorization ANN, a colorized image from the adapted representation; and
  - computationally updating weights of the adaptor ANN based on a loss function that comprises a difference between the colorized image and the second image of the image pair; and
- providing the plurality of image filtering modules, the trained adaptor ANN, and the trained colorization ANN.

* * * * *